US007185285B2

(12) United States Patent
Van Dok et al.

(10) Patent No.: US 7,185,285 B2
(45) Date of Patent: Feb. 27, 2007

(54) USER INTERFACE AND CONTENT ENHANCEMENTS FOR REAL-TIME COMMUNICATION

(75) Inventors: Cornelis K. Van Dok, Bellevue, WA (US); Peyman Oreizy, Kirkland, WA (US); Sean O. Blagsvedt, Seattle, WA (US); Donna Ghosh, State College, PA (US)

(73) Assignee: Microsoft Corporation, Redmond, WA (US)

( * ) Notice: Subject to any disclaimer, the term of this patent is extended or adjusted under 35 U.S.C. 154(b) by 788 days.

(21) Appl. No.: 10/369,006

(22) Filed: Feb. 19, 2003

(65) Prior Publication Data

US 2004/0162877 A1    Aug. 19, 2004

(51) Int. Cl.
*G06F 3/00* (2006.01)
*G06F 3/14* (2006.01)

(52) U.S. Cl. .................. 715/753; 715/733; 715/751; 715/752; 715/758; 715/501.1

(58) Field of Classification Search ............... 715/733, 715/738, 739, 744, 751–753, 758, 760, 764, 715/765, 810, 835, 846, 500.1, 501.1, 542
See application file for complete search history.

(56) References Cited

U.S. PATENT DOCUMENTS

| 5,450,538 | A | * | 9/1995 | Glaser et al. ............... 715/508 |
| 5,583,981 | A | * | 12/1996 | Pleyer ......................... 715/800 |
| 5,715,415 | A | * | 2/1998 | Dazey et al. ............... 715/708 |
| 5,874,953 | A | | 2/1999 | Webster et al. ............. 345/329 |
| 5,898,431 | A | | 4/1999 | Webster et al. ............. 345/331 |
| 6,052,121 | A | | 4/2000 | Webster et al. ............. 345/329 |
| 6,310,632 | B1 | | 10/2001 | Monroe et al. ............. 345/808 |
| 6,396,487 | B1 | | 5/2002 | Jameson ..................... 345/342 |
| 6,411,312 | B1 | | 6/2002 | Sheppard ..................... 345/769 |
| 6,865,599 | B2 | * | 3/2005 | Zhang ......................... 709/218 |
| 6,964,010 | B1 | * | 11/2005 | Sharp .......................... 715/507 |
| 2003/0023684 | A1 | * | 1/2003 | Brown et al. ............... 709/204 |
| 2003/0189594 | A1 | * | 10/2003 | Jones .......................... 345/764 |
| 2003/0225846 | A1 | * | 12/2003 | Heikes et al. ............... 709/207 |
| 2004/0148346 | A1 | * | 7/2004 | Weaver et al. .............. 709/204 |
| 2004/0150673 | A1 | * | 8/2004 | Dobronsky .................. 345/810 |
| 2006/0031772 | A1 | * | 2/2006 | Valeski ....................... 715/751 |

OTHER PUBLICATIONS

Shrikumar, H.; Post, Rehmi, "*Thinternet: life a tteh end of a tether*," Computer Networks and ISDN Systems, vol. 27, No. 5, pp. 375-385.

(Continued)

*Primary Examiner*—Lucila X. Bautista
(74) *Attorney, Agent, or Firm*—Workman Nydegger (57) ABSTRACT

Several enhancements to a real-time communications user interface are provided to add functionality and personality in such communications as instant messaging. These enhancements are geared at least in part to making the user interface more personalized between users in a real-time communication session, including personalized fonts, spacing, extensible emoticons, etc. Other enhancements are geared in part toward enhancing the use of the interface. For example, a dynamically changing input box may remove a need for scroll bars, and edit control of previous messages may remove the need to send corrective messages. A number of these enhancements may be accomplished through the use of markup languages in the user interface. One or more of the disclosed enhancements may improve the immediacy, readability, and functionality of instant message conversations.

19 Claims, 11 Drawing Sheets

OTHER PUBLICATIONS

Cohen, Edith; Krishnamurthy, Balachander; and Rexford, Jennifer, "*Efficient Algorithms for Predicting Requests to Web Servers*," Proceedings IEEE INFOCOM '99 The Conference on Computer Communications Eighteenth Annual Joint Conference of the IEEE Computer Communications Societies, Mar. 21-25, 1999, vol. 1, 284-293.

Whitfield, Nigel, "*Instant Messaging*," Personal Computer World, <www.pcw.co.uk>, Aug. 2002, pp. 135-152.

Smith, Marc; Cadiz, JJ; and Burkhalter, Byron, "*Conversation Trees and Threaded Chats*," CSCW2000 Computer Supported Cooperative Work, ACM 2000 Conference on Computer Supported Cooperative Work, Dec. 2-6, 2000, pp. 97-105.

Wall Street & Technology Cover Story: "*All Messages Will Be Stored*," Wall Street & Technology, Aug. 2002, pp. 14-18.

\* cited by examiner

USER INTERFACE AND CONTENT ENHANCEMENTS FOR REAL-TIME COMMUNICATION

CROSS-REFERENCE TO RELATED APPLICATIONS

N/A

BACKGROUND OF THE INVENTION

1. The Field of the Invention

The present invention relates to user interfaces and content for real-time communication. More particularly, the present invention relates to methods, systems, and computer program products that provide a sending system with enhanced flexibility for the type of content that may be included in a real-time message or enhanced control over the presentation of the real-time message at a receiving system.

2. The Relevant Technology

The popularity of the Internet and satellite-based technologies has enhanced the way people communicate with each other by allowing users quick and easy access to a virtually endless sea of communication methods. Any given person may now contact another person with greater or lesser immediacy using various media, including the World Wide Web, electronic mail (email), cellular, satellite or Internet telephony, video conferencing, and instant text messaging. These methods allow people to stay in touch with each other around the globe, and to access information on many subjects, in some cases instantly.

Currently, instant text messaging is one of the more popular forms of relatively immediate (or real-time) communication. In operation, a user installs software on a computer to communicate with another user within a generally proprietary instant communication network. When the user executes the software, the software displays a user interface (UI) in which the sending user may type and send text messages to a recipient user, the text appearing at the recipient user almost instantly (or, in real-time). Instant messaging, therefore, offers several advantages over other types of text messaging services such as email.

For example, in email, a user sends an electronic message to a recipient user through an email server, a server stores the sender's message, and the recipient user retrieves (downloads) the sent message from the email server. The recipient may or may not have an email user interface open at the time the message is sent, and may view the message later. In contrast, traditional instant messaging requires, generally, that a sending and receiving user in a conversation be online with the same service provider at the same time. This is due in part to the proprietary nature of most instant messaging networks and the nature of the instant messaging implementations.

Instant messaging transmits a message directly from one user to another user, generally without storage and retrieval from an intermediate server. Messages appear in each user's interface in time-dependant alternating segments, following the flow of a conversation. For example, a sending user's text may appear at the top of the sender's interface and receiver's interface, with the receiving user's response just under the sent text. This alternating of sequential conversation lines allows for a more fluid computerized text conversation between users, as compared to email for example. Thus, once a recipient user receives a message, the recipient user may begin typing a response, and may have the response viewed immediately, in line with the previous text.

Figure 1:
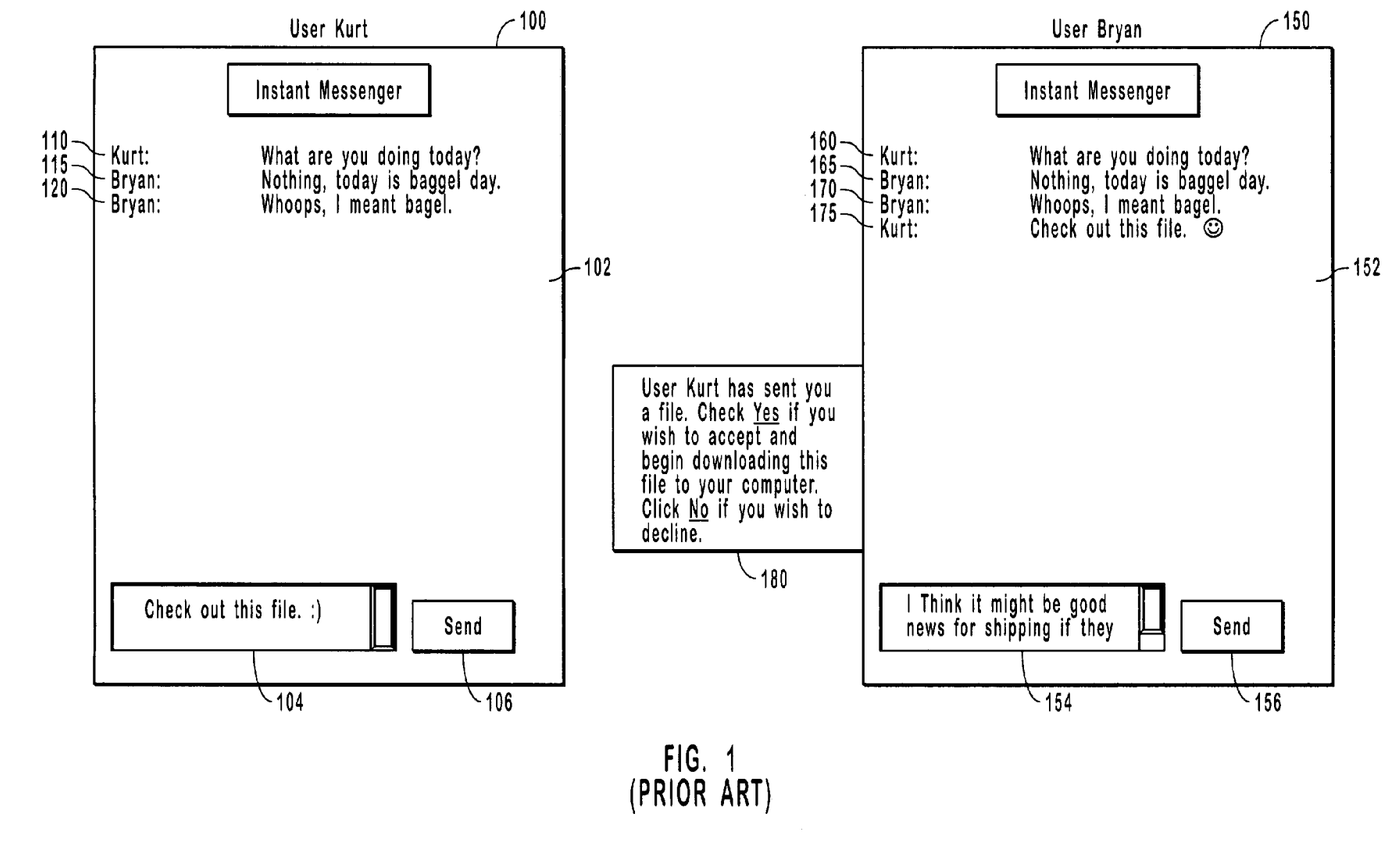
FIG. 1 illustrates two prior art user interfaces for real-time messaging.

Despite the convenience and relative immediacy of instant messaging, some significant shortcomings remain. FIG. 1, for example, summarizes some of the problems found in known instant message implementations. In particular, FIG. 1 illustrates a prior art representation of two instant messaging user interfaces, 100 and 150. User interface 100 for User Kurt includes a conversation window 102, a text input box 104, a send button 106, and conversation lines 110, 115, and 120. Similarly, user interface 150 for User Bryan includes a conversation window 152, a text input box 154, a send button 156, and conversation lines 160, 165, 170 and 175. It should be understood that user interfaces 100 and 150 operate both to send and to receive real-time messages.

As shown in FIG. 1, there is no visual distinction, other than user name, between message lines 110, 115, and 120—the lines are spaced in identical, horizontal positioning relative to each other, with no variation in font or font color. Neither user is able to control or influence how a message may be displayed to other users. This lack of formatting distinction between conversation lines can make it difficult to distinguish between users, particularly in longer conversations, conversations between more than two users, or old conversations that have been saved for later review. Note also that a significant amount of space is devoted to the user name display.

Another problem illustrated in FIG. 1 relates to relatively long messages. For example, in user interface 150, as User Bryan types a message that exceeds the size of the text input box 154, a scroll bar becomes active on the right side of input box 154 allowing User Bryan to preview his message by scrolling up and down through portions of the message. Generally, text input box 154 should be relatively small since instant messaging tends to involve short messages. Enlarging the input box for all messages is undesirable because a large input box consumes space that might otherwise be put to more productive use. Scrolling, however, also is undesirable because the additional user input required interferes with the real-time aspect of instant messaging.

As also shown in FIG. 1, occasionally a user will make an error while entering an instant message. For example, lines 115 and 165 represent a message with a misspelled word. Existing instant messaging systems allow for correction of a prior message by sending a corrected message, represented by lines 120 and 170. Here, User Kurt 100 and User Bryan 150 both see that Bryan misspelled the word bagel as "baggel" 115, but both also see Bryan's correction, and the error in lines 115 and 165 remains. Corrections of this type are particularly burdensome if they arrive out of order, after the conversation has moved on, possibly to another topic entirely. Among other things, one reason instant messaging conversations may move on to new topics before a correction can be made is that known implementations do not provide adequate indications that one party to a conversation is composing a message.

Transferring files via known instant messaging implementations also can be somewhat cumbersome as shown FIG. 1. Kurt types to Bryan in input box 104 that he will be sending Bryan a file through the instant messaging application. Rather than sending the file directly to Bryan through the interface, Bryan's interface 100 prompts Bryan through a separate interface 180 to either accept or reject the file transfer to Bryan's computer storage. Bryan's user interface 100 presents neither the file nor a representation of the file. Accordingly, Bryan may only view the file after accepting the file for download through interface 180.

Yet another problem with existing interface for real-time communication relates to emoticons. An emoticon or emotional icon is a textual or graphical expression of emotion, such a smile ":)" or ☺ that is suitable for instant messaging. Presumably emoticons help compensate for the absence of intonation, body language, and other expressions of emotion that occur in other types of conversations. Known instant messaging implementations fail to allow users the opportunity of defining or creating their own emoticons, and in some cases fail to show a graphical representation for a textually entered emoticon until after a message is sent. For example, a text sequence such as ":)" may not display as ☺, for either User Kurt or User Bryan, until after sending the message that contains the text sequence, as illustrated in FIG. 1 by text box 104 and message line 175.

Accordingly, what is desired are systems, methods, and computer program products that provide a sending system with enhanced flexibility for the type of content that may be included in a real-time message or enhanced control over the presentation of the real-time message at a receiving system or otherwise facilitate sending and receiving real-time messages.

BRIEF SUMMARY OF THE INVENTION

The present invention provides various mechanisms that enhance flexibility for the type of content that may be included in a real-time message, enhance control over the presentation of the real-time message, and/or otherwise facilitate the sending and receiving of real-time or instant messages. In particular, the present invention allows for sending real-time messages between contacts using a markup language. Real-time messages formatted, at least in part, according to a markup language may enhance the presentation and information communicated in real-time messages, by allowing users to select personalized fonts and font colors as well as other rich formatting capabilities and by expanding the types of information that may be included in a message, such as corrections to previous messages, data files, image files, user-defined emoticons, and multimedia files. Such formatting facilitates presenting the various types of content that may be included in a real-time message, inline with the real-time message's text.

Automatically or randomly assigning a font and font color for a user's real-time messages in a message session allows the user to communicate additional information that may help other participants to identify the user, and provides an additional level of expression for the user. Of course, the invention also allows a user to bypass any such automatic or random format assignments, and select personalized formatting. Varying indentation when displaying real-time messages also may be used to distinguish between users. In some circumstances, the user name may be dropped from display, perhaps after several messages have been exchanged, because the font, font color, and/or indentation are sufficient to identify a user to others.

While typing a real-time message, an input box may be dynamically resized to accommodate the amount of text being entered. An inline indication that a real-time message is being composed may help the flow of a conversation that takes place with real-time messages. For example, a user would see an inline typing indication where the message would appear more readily than the user would if the typing indication were elsewhere on the message interface, such as on a status bar. Corrections may be made to previously sent real-time messages such that the previously sent messages reflect the correction, without interrupting the flow of later messages.

These and other objects and features of the present invention will become more fully apparent from the following description and appended claims, or may be learned by practicing of the invention as set forth hereinafter.

BRIEF DESCRIPTION OF THE DRAWINGS

To further clarify the above and other advantages and features of the present invention, a more particular description of the invention will be rendered by references to specific embodiments thereof, which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention extends to methods, systems, and computer program products for enhanced user interface and content for real-time communications. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Turning now to the present invention, one of ordinary skill will appreciate that any user interface in a real-time conversation may operate as a sender or a receiver (or both) of real-time communication messages. All references to a particular user in the figures that follow should be understood generally to include multiple users, which have been omitted from the drawings merely to promote clarity in describing the present invention. One of ordinary skill will also appreciate that a computerized message as discussed in the present application, generally, may comprise typed text, a computerized file, portions of a computerized file, an image, an object, video, audio, or some combination of the preceding, etc.

In addition, it should be understood that the term markup language, generally, encompasses any of a wide variety of markup languages, including various procedural, declarative, and descriptive markup languages, such as extensible markup language (XML), voice markup language (VML), handheld device markup language (HDML), hypertext markup language (HTML), extensible hypertext markup language (XHTML), and/or dynamic hypertext markup language (DHTML). Thus, references to markup languages in this application should not be construed as necessarily limited to any specific markup language.

By way of further explanation, markup languages generally comprise tags that describe how a sequence of text or other content should be displayed and/or interpreted. (Markup languages also may provide for scripts, objects, instructions, or other executable content.) In the case of HTML, a common markup language used in Internet documents, certain tags may describe certain formatting of textual elements in a given paragraph. For example, the tag and text sequence "<font color="#000000" face="Arial">Hello Mom!</font>" states that the text "Hello Mom!" should be displayed in black color, in the Arial font. Other HTML tags may describe certain spatial positioning of textual elements in a given paragraph. For example, the tag and text sequence "<table><tr><td>Score</td><td>25-24</td></tr></table>" indicates that the words "Score" and "25-24" should be placed in separate horizontal cells on the same row of a table. These and other types of markup language tags are well known to those of ordinary skill in the art.

Figure 2A:
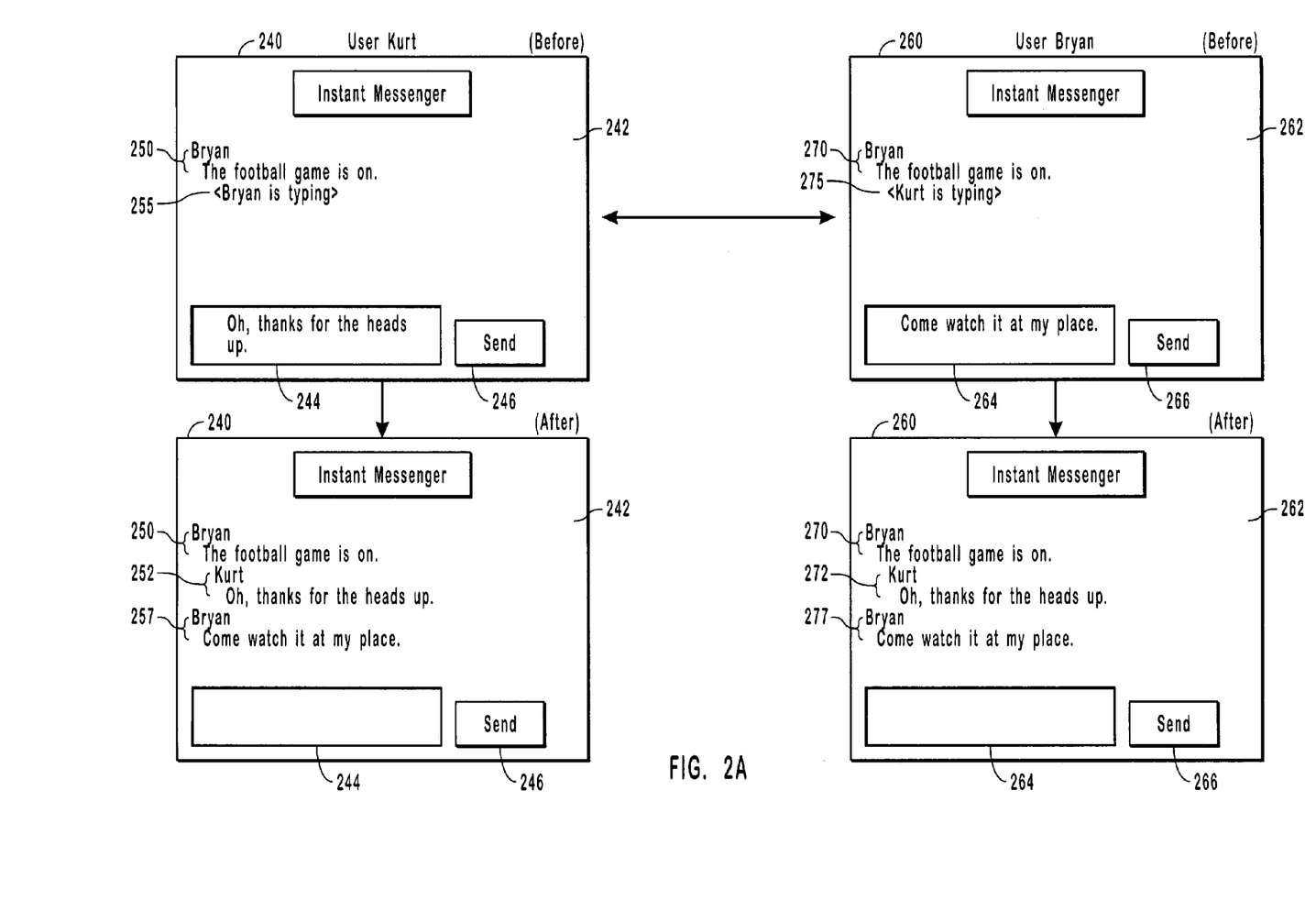
FIG. 2A illustrates an example use of contact names and typing indicators in accordance with the present invention.

With respect to FIG. 2A, "Before" and "After" interfaces 240 (User Kurt) and 260 (User Bryan) illustrates the use of contact names and typing indicators in accordance with the present invention. Initially, User Bryan enters an instant or real-time message to User Kurt that a football game of mutual interest is being broadcast. The message appears in the conversation or history area 262 of user interface 260 as message 270 and in the conversation or history area 242 of user interface 240 as message 250. In response to this message, both User Bryan and User Kurt enter subsequent instant messages.

In particular, User Kurt enters a message into text input box 244 thanking User Bryan for the reminder. User Bryan follows his reminder about the football game by entering an invitation in text input box 264 for User Kurt to watch the football game with User Bryan. Note that an indication of a message is being composed by another user appears in each user interface. Specifically, the indication 255 "<Bryan is typing>" appears at user interface 240 for User Kurt, and similarly, the indication 275 "<Kurt is typing>" appears at user interface 260 for User Bryan. In this particular embodiment, the indication text flashes or flickers. Other types of indications, including sounds, graphics, various text effects, and the like, also may be used. Among other things, the indication helps alert other participants that a message will be received shortly, so that exchanges may proceed in a somewhat orderly fashion. Such indications are especially useful when a given instant message takes relatively long to compose (based either on the time to enter or receive the message).

Notably, FIG. 2A (as in other figures) shows the typing indicator inline with where the sending user's text will appear in the context of the conversation history. Since prior typing indicators in user interfaces—where they have used an indicator—have been only in a status bar portion of a user interface, the prior indicators do not readily alert a user that another is typing, when the recipient user is reading the conversation history. The recipient user in such a situation will only notice the typing indicator if the user averts his eyes elsewhere from the conversation history, and look at the status bar.

For heightened efficiency, the present invention allows the typing indicator 275 to be placed roughly where the new text will appear after being sent. This allows the receiving user to notice the indicator 275 more readily, as well as to add identification to whoever is typing. For example, if the recipient user cannot read the typing indicator (perhaps because it is small text), the recipient user may nevertheless recognize who is typing a new message based on the placement (or the spacing) or alignment of the typing indicator. In the case of a multiple user chat session, a user may realize instantly that several users are typing since there are several typing indicators in various portions of the user interface, consistent with the spacing accorded to other text those other users have sent.

Upon completing his invitation, User Bryan presses send button 266, and upon completing his reply, User Kurt presses send button 246, as reflected in the "After" versions of interfaces 240 and 260. Note that User Kurt's interface shows User Bryan's initial message 250, followed by User Kurt's reply 252, and User Bryan subsequent invitation 257. The ordering is based on the time each message is received. User Kurt's reply 252 is indented to improve readability and to help identify or distinguish User Kurt in some visual fashion. User Bryan's "After" interface 260 is similarly arranged, with User Bryan's initial message 270, followed by User Kurt's reply 272, and User Bryan's subsequent invitation 277. Here too, User Kurt's reply 272 is indented to improve readability and to help identify or distinguish User Kurt in some visual fashion. Visual cues to identify or distinguish a user are particularly valuable as the number of participates in an instant messaging conversation grows. The indentation assigned to each user may be based on a variety of factors including who initiated the conversation, who is sending the most messages, etc.

The senders' user name, which can be any name associated with the user such as contact name, login name, screen name, or real-time address, etc., precedes the instant messages in FIG. 2A. This depiction, however, is only one way of representing the text in conjunction with the user's names. For example, each user name could also be displayed to the side of each text, or underneath each message, and so on, rather than simply above the message, as shown in FIG. 2A. Depending on the circumstances, how easily a sender is identified can aid flow and speed of a real-time conversation in part, since a user can more readily identify to whom (or about what) he or she should address comments.

Figure 2B:
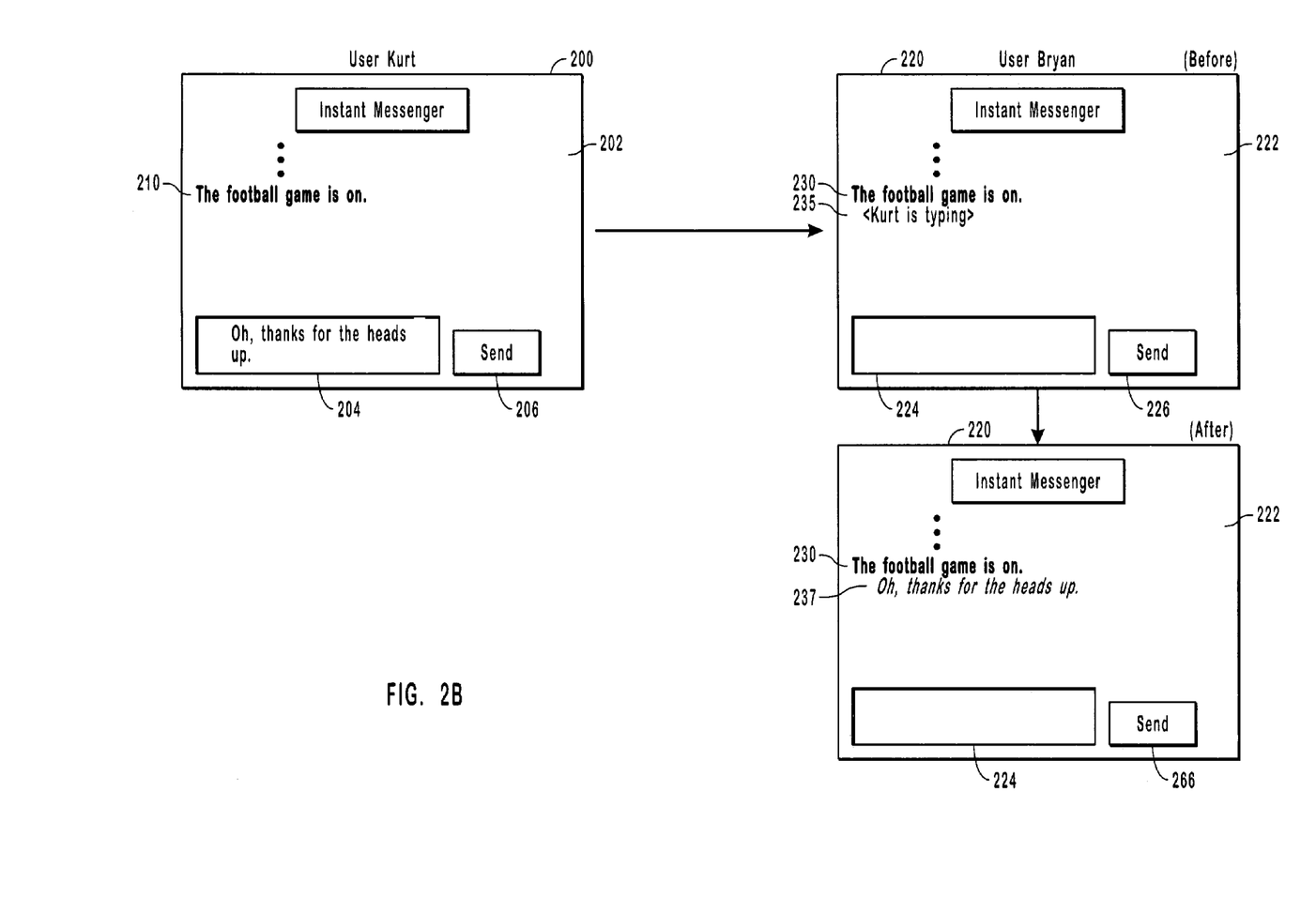
FIG. 2B illustrates an example use of indentation and different fonts in accordance with the present invention to help identify the sender of a real-time message.

FIG. 2B illustrates the use of indentation and differing fonts in "Before" and "After" interface 220 (User Bryan), but without a user name that identifies the sender of a real-time message. For example, if the exchange illustrated in FIG. 2A had been preceded by several earlier messages (the dots in FIG. 2B), it may be possible to drop user names. One reason to drop user names relates to conserving and optimizing the use of available display space. After several messages have been exchanged, user names may represent redundant information that can be eliminated.

As discussed above with respect to FIG. 2A, User Bryan enters a message to User Kurt that a football game of mutual interest is being broadcast. The message appears as real-time message 210 in the conversation or history area 202 of user interface 200 and as real-time message 230 in the conversation or history area 222 of user interface 220. In response to this message, User Kurt enters a message into text input box 204 thanking User Bryan for the reminder. Note that an indication 235 of User Kurt composing his response appears in the "Before" user interface 220 of User Bryan.

Preferably, indication 235 appears where the corresponding message will be displayed eventually (i.e., "inline"), making it easier for participants to recognize that another user is composing a message. Although not illustrated, the indication may appear on both sending and receiving user interfaces, which may help to provide context for the instant message being composed, particularly if several participants are composing messages simultaneously. For example, a quickly composed message may be received prior to a message composed more slowly. If ordering were based strictly on the time a message is received, the quickly composed message may appear before the slow message, making the slow message seem to be a response to the quick message, when in fact the slow message is a response to the initial message. An indication that one or more participants are composing, perhaps simultaneously, a message or response, helps inform other users of each eventually received message's context. Of course, the indication may provide additional advantages as well.

Upon completing his reply, User Kurt presses send button 206, as reflected in the "After" version of user interface 220. Note that User Bryan's interface shows User Bryan's initial message 230, followed by User Kurt's reply 237. User Kurt's reply 237 is indented and shows in a different font (italic) and/or font color to improve readability and to help identify or distinguish User Kurt and User Bryan in some visual fashion.

The particular font choice may be based on various factors. For the embodiment illustrated in FIG. 2B, the font may be specified by the message sender, or may be randomly assigned by the application interface. For the example of FIG. 2B where there are two users involved, the present invention may determine a font, font color, etc. for the initiator of the conversation, and a different font, font color, etc. for the invited, or any subsequent user. Hence, each user in a message session can be automatically differentiated by a unique format identity. Alternatively, a user may bypass the assigned formatting during the installation or configuration of instant messaging software, or at some point after the formatting has been assigned. Whether the invention randomly assigns the default formatting, or the user personally selects a representative formatting, the formatting may be communicated in the message itself by formatting at least a portion of the message in accordance with a markup language.

Figure 3:
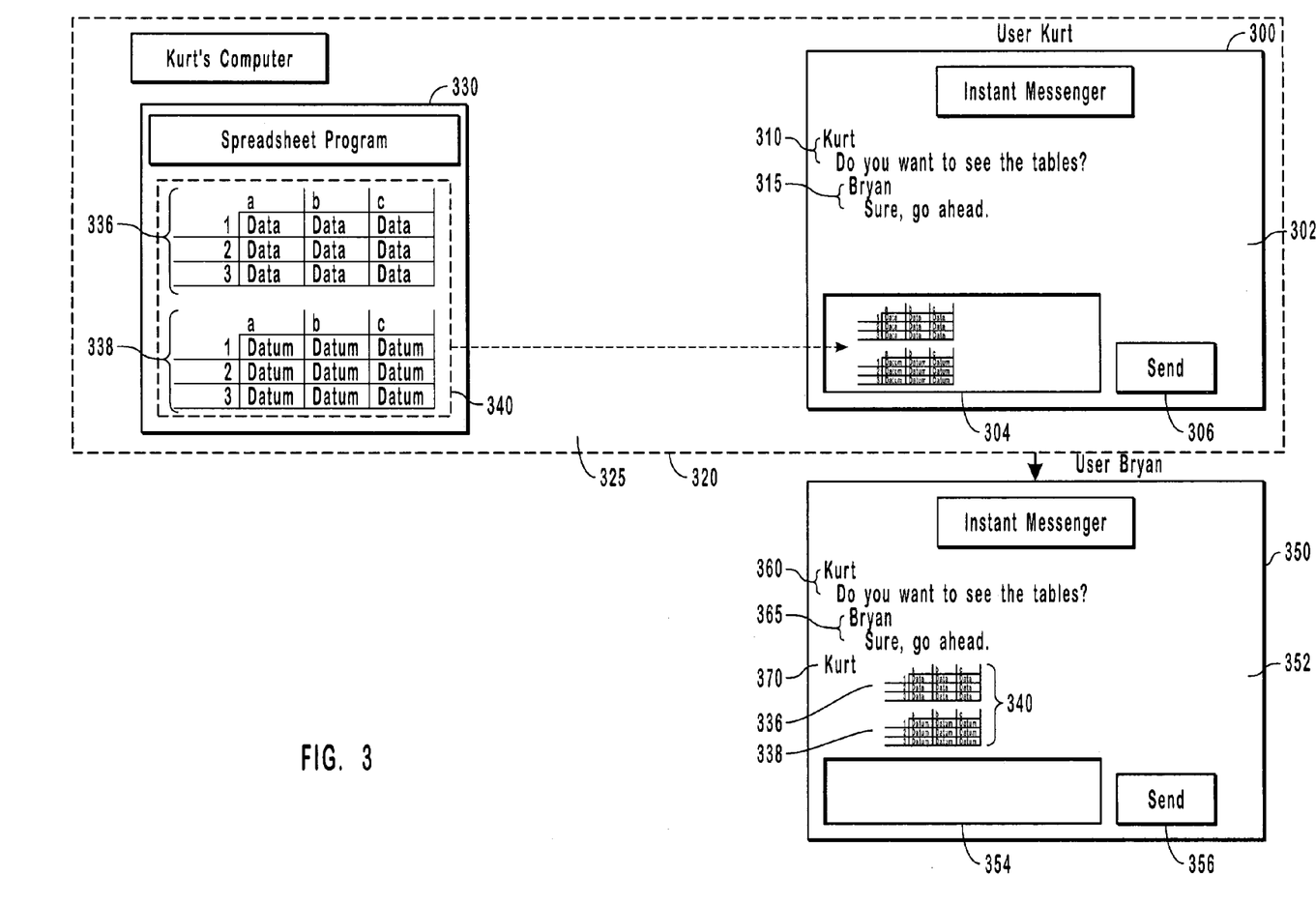
FIG. 3 illustrates an example of transferring and displaying portions of a file via an instant message in accordance with the present invention.

Referring now to FIG. 3, the figure illustrates the use of a markup language for including rich text (such as, e.g., formatted spreadsheet tables), files, or other content in instant messages. FIG. 3 shows instant messenger user interfaces 300 (User Kurt) and 350 (User Bryan), with conversation or history windows 302 and 352, input boxes 304 and 354, and send buttons 306 and 356. The dashed box 320 represents a computer monitor for User Kurt's Computer, with screen 325, upon which the instant messenger 300 and application 330 interfaces are open. Application interface 330 shows a spreadsheet program having formatted spreadsheet tables 336 and 338. In operation, User Kurt sends an instant message 310 to User Bryan (displayed as message 360 on interface 350), if User Bryan would like to see the tables 336 and 338.

User Bryan responds (instant message 315 on user interface 300 and instant message 365 on user interface 350) to send them. User Kurt then selects (shown by dotted line 340) the content (i.e., tables 336, 338) from application program 330, copies the content, and pastes the content into input box 304. As discussed above in connection with FIGS. 2A and 2B, a typing indicator may appear in either interface when Kurt pastes the tables into input box 304 or upon User Kurt's typing additional text. When User Kurt selects send button 306, the content is sent as an inline instant message 370, with formatting similar to its appearance in the application program 330.

A markup language may be one way of facilitating the real-time transmission of rich text in message 370. One of ordinary skill in the art will appreciate that the traditional copying and pasting functions may automatically cause a conversion of some text to the same text in a markup language to provide appropriate formatting. (Formatting may also occur as part of the send operation.) Such may allow the table arrangements (shown in application interface 330) to be arranged with a markup language prior or subsequent to pasting the table, or prior to transmitting the table, etc.

For example, a paste or other operation may embed within the text transmission of a typical table, such as a portion of table 336, the following HTML tags indicating a table, row, column, and cell of specific text: <table><tr><td>a</td></td><td>b</td><td>c</td></tr></table>. One of ordinary skill in the art will appreciate that, in addition to HTML, such table text may be described with other markup languages, and also may include additional formatting elements other than text position. In particular, the markup language may identify an application to use in viewing the content and may provide appropriate delimiters for that application or may provide neutral formatting that any of several applications may interpret, etc.

Figure 4:
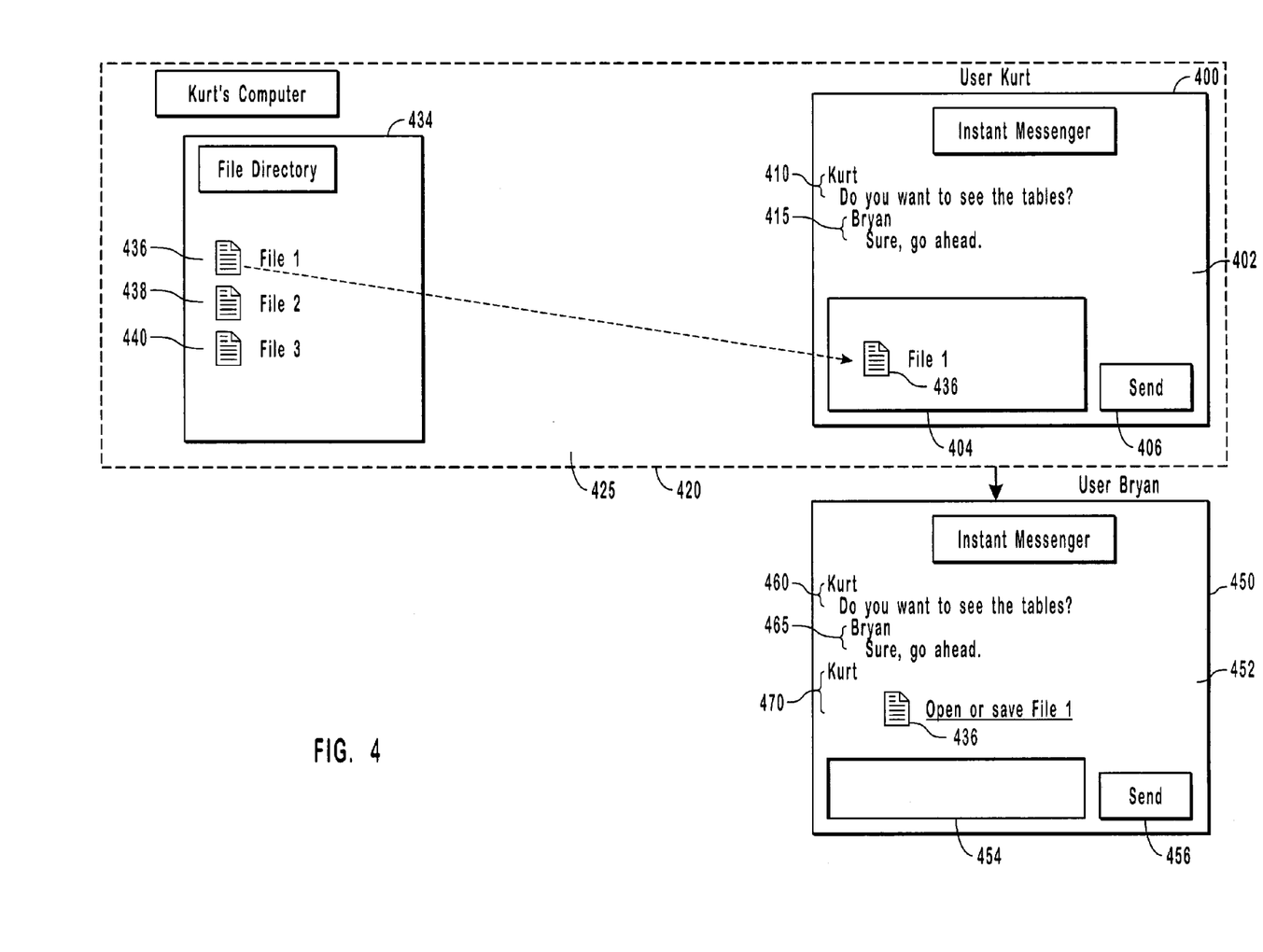
FIG. 4 illustrates an example of transferring an entire file via an instant message, in accordance with the present invention.

FIG. 4 illustrates an embodiment similar to FIG. 3 with regard to inline transmissions; except, rather than transmitting portions of a file in rich text, FIG. 4 illustrates transferring the file itself. FIG. 4 shows two instant or real-time message user interfaces 400 (User Kurt) and 450 (User Bryan) having conversation or history windows 402 and 452, input boxes 404 and 454 and send buttons 406 and 456. User interface 400 is shown separately and displayed on computer monitor 420, having desktop screen 425, and an open user interface for a file directory 434 displaying files 436, 438, and 440. User Kurt sends User Bryan an instant message (410 in user interface 400 and 460 in user interface 450) asking if User Bryan would like to view file 1 (436).

User Bryan responds with an instant or real-time message (415 in user interface 400 and 465 in user interface 450) in the affirmative, and so, as seen on screen 425, User Kurt "drags and drops" a copy of file 436 into the input box 404 of user interface 400. This ability to "drag and drop" a copy of a file, as shown, is well known in the art, and is common among graphical user interfaces, or operating systems employing such. "Drag and drop" refers simply to a user's selecting an object and moving the object from one portion of a computer screen to another portion of the computer screen.

When User Kurt selects send button 406 to send the file, a typing indicator (if present) is replaced with message 470 on user interface 450. Message 470 also may appear on user interface 400 (though shown only in 450), and will include at least some representation of file 1 (436) inline with the text, preferably spaced horizontally consistent with other messages sent by Kurt (e.g., message 460). User Bryan may then select to open or save the file 436, as shown in user interface 450.

Figure 5A:
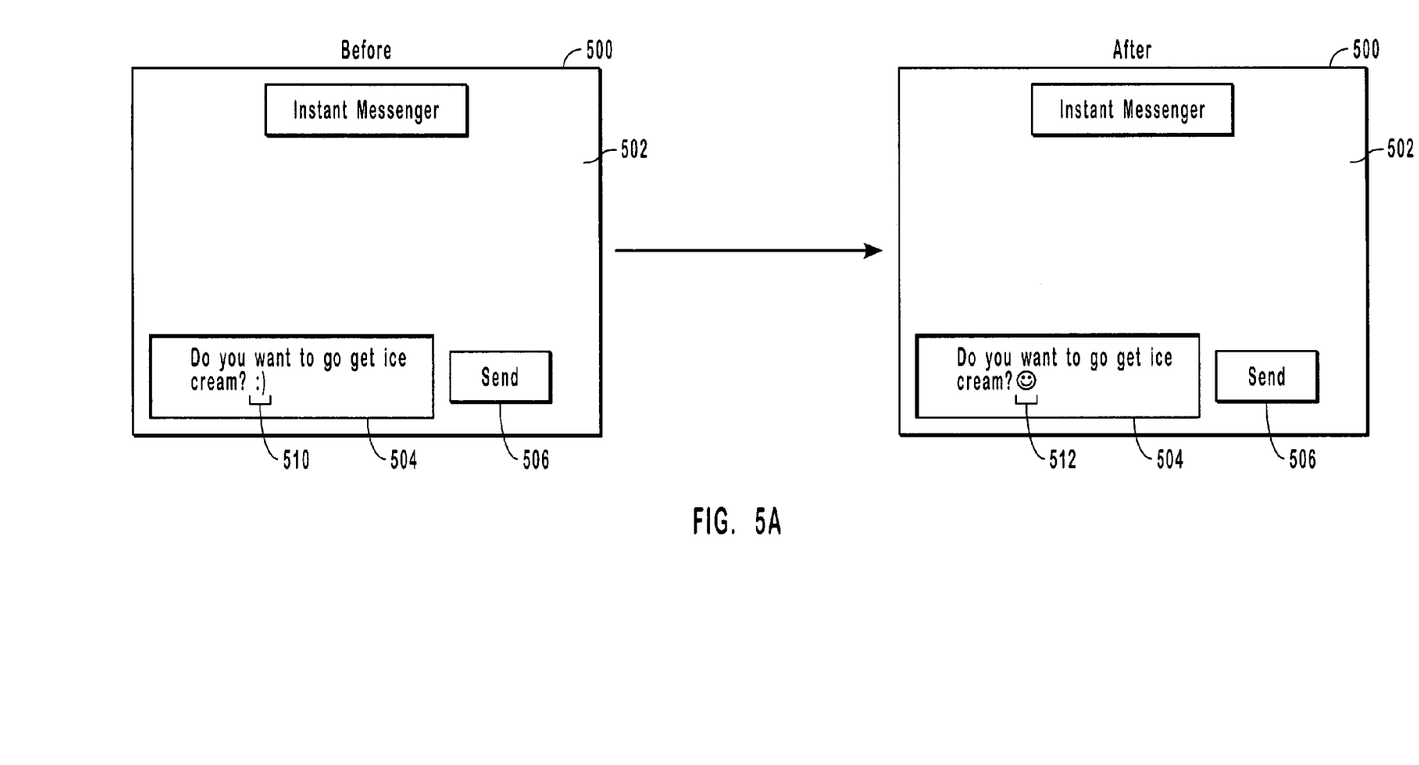
FIG. 5A illustrates an example automatic emoticon replacement in accordance with the present invention.

FIG. 5A illustrates instant messaging user interface 500, having conversation window 502, input box 504, and send button 506, both "Before" and "After" automatic emoticon replacement in accordance with the present invention. The user interface interprets, for example, the text sequence ":)" 510 automatically as the smiley face character ☺ 512, before a user selects the send button 506 for the instant message in input box 504. Among other things, replacement before sending the real-time message allows the user composing the message to preview how the message will appear when received. Of course, text sequence 510 is merely one example of many possible text sequences for potentially many different emoticons that may be available. Which text sequences correspond to which emoticons may be user configurable, including the ability to specify user-defined emoticons as described in greater detail below.

Figure 5B:
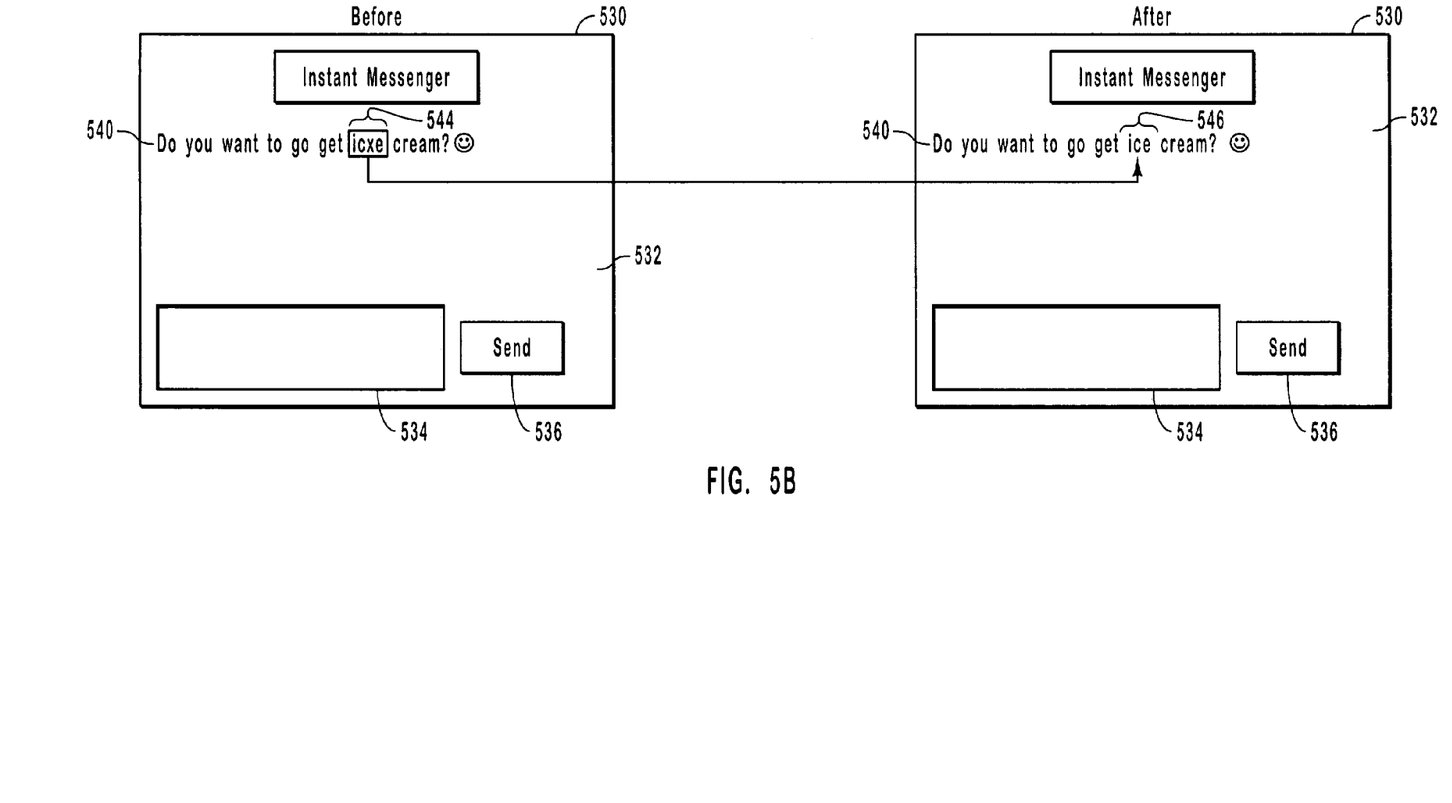
FIG. 5B illustrates an example of editing an instant message in accordance with the present invention.

FIG. 5B illustrates instant messaging user interface 530, having conversation window 532, input box 534, and send button 536, both "Before" and "After" editing a previously sent instant or real-time message 540. As shown before editing, message 540 contains a typographical error—the word "icxe" 544 has been misspelled. Conventionally, errors of this sort are corrected by sending a follow-up message with the correction. As shown in FIG. 1, the erroneous message 165 remains, but the sender is at least able to acknowledge the error in the correction message 170.

Instant messaging interface 530, however, allows the user to select the misspelled word "icxe" 544 from the message 540 in the conversation window 532 and correctly spell "ice" 546, as shown in the "After" version of user interface 530. Whatever editing of a message, e.g. message 540, occurs will be displayed in the conversation window for the user interfaces involved in the conversation. Rather than displaying as a new message, however, the corrected message displays in place of the message being corrected as shown in conversation window 532. Among other things, this may improve the conversation flow because the correction can be made without users having to read the correction as a conversation progresses.

It should be appreciated that editing control need not be limited to the user who sent a message, e.g. 540, and that the user may be able to grant or otherwise authorize editing control to other users. Such flexibility may be desirable for online meetings for which minutes are generated from a log of the exchanged instant messages. It should also be appreciated that a correction message may replace a previous message entirely or may simply provide sufficient correction information. For example, the entire message 540 may be resent and replaced, or only a portion of the message, in this case the correction of "icxe" 544 to "ice" 546 may be resent and replaced.

In order to facilitate correction, messages may be assigned an identifier so that corrections can be more easily applied to the corresponding message to correct. A variety of techniques may be used in implementing correction messages, such as differencing/comparison/tracking operations that are commonly used to identify changes in content. Therefore, the present invention is not necessarily limited to any particular correction message implementation, as long as the message or portion of the message to be corrected can be identified to a sufficient degree.

Figure 6A:
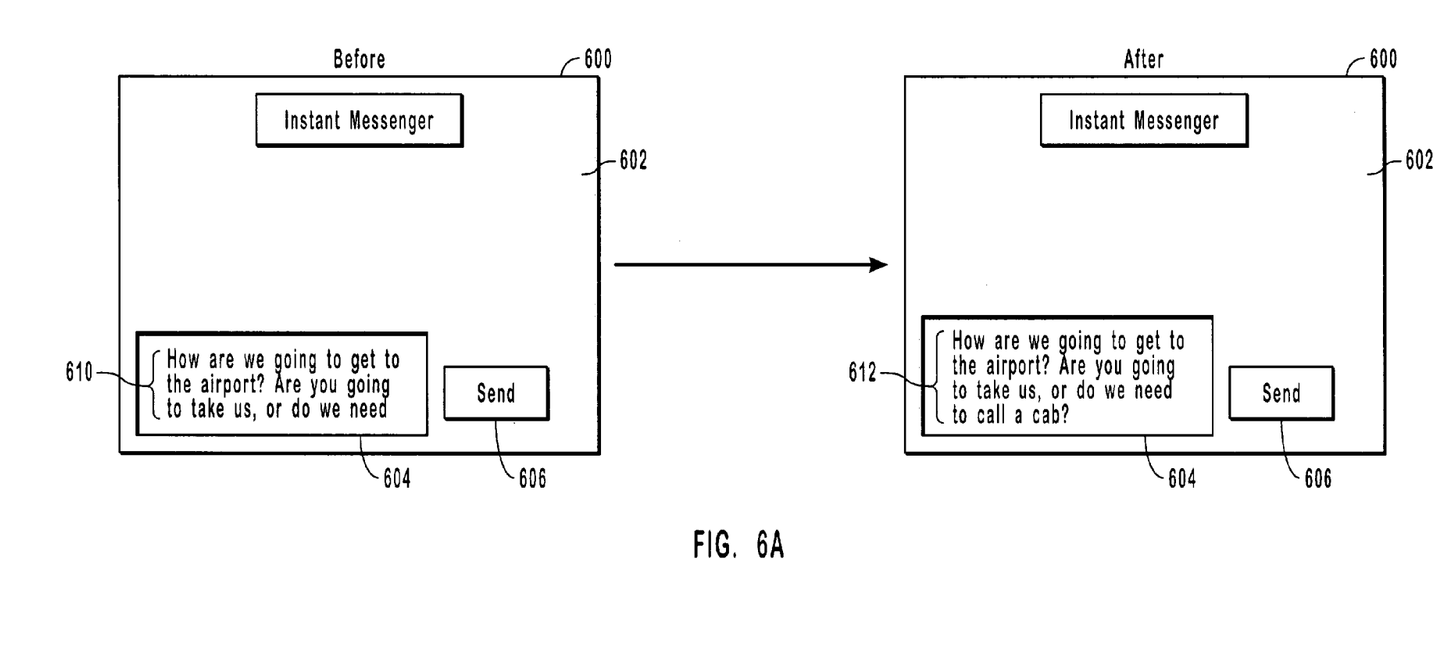
FIG. 6A illustrates an example text input box in accordance with the present invention.
Figure 6B:
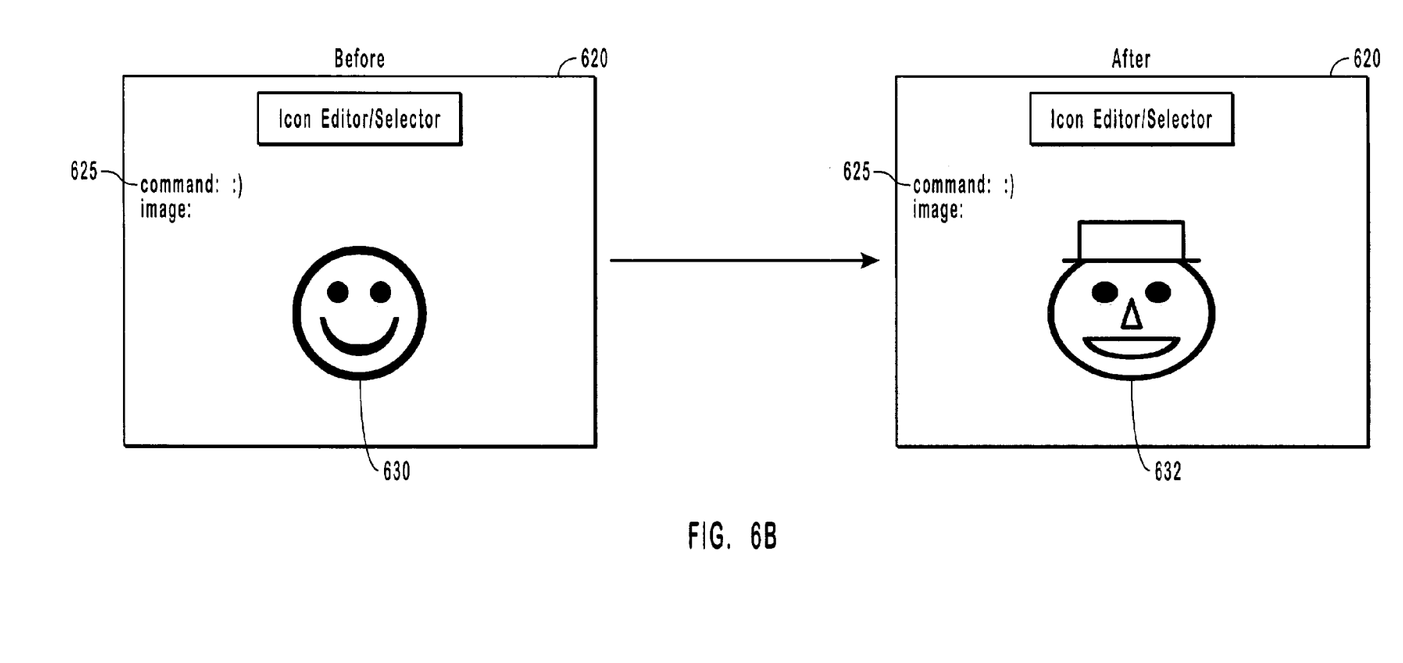
FIG. 6B illustrates an example use of extensible emoticons in accordance with the present invention.

FIGS. 6A and 6B illustrate additional embodiments of the present invention with "Before" and "After" representations of an automatically expanding text input box and of user-definable or extensible emoticons. In FIG. 6A, a user interface 600 comprises a history area 602, an input box 604 and a send button 606. As the message 610 approaches the initial size of input box 604 (user interface 600 "Before"), input box 604 automatically expands (user interface 600 "After") to accommodate the longer text message 612.

The expanded input box allows for a full preview of the message, without scrolling and without dedicating additional space to the input box, which in many cases needs to accommodate only the relatively short messages that are common to an instant messaging environment. While scrolling is certainly an option, the added user interaction imposed by scroll bars tends to interfere with the real-time nature of instant messaging.

FIG. 6B shows an example of an emoticon, or Icon Editor/Selector that may allow a user to better personalize the real-time communication experience. As a default, instant messaging software may be configured for representing the text sequence ":)" 625 automatically as the smiley face shown 630. The user, however, may wish to alter the icon to the user's own personal tastes, and so may edit the text sequence ":)" 625 ("After") to the smiley face 632 that includes a hat, nose, and different smile. Similarly, a user may wish to import or select from a personal pictures directory a digital image such as, e.g., a casual photo of the user smiling, frowning, or exhibiting some sort of other emotion or gesture. The user could alter the selected image to conform to emoticon sizes or specifications for later use as a personalized emoticon. The user could also assign this new, personalized emoticon a specific keystroke value so that it can be called upon readily in a real-time conversation. One should appreciate that allowing a user to personalize the real-time communication experience in one or more of these ways not only enriches the communication, but aids in identification of certain users.

Of course, a user may choose emoticons from a variety of graphical or multimedia content. Some content may have been created or modified by the user, whereas other content simply may reflect the personality or emotional state of the user. Accordingly, in this application, user-defined emoticons should be interpreted broadly to encompass both content that has been created or modified by a user, as well as content selected by the user that is external to the instant messaging software. It should be noted that formatting instant messages or at least a portion of an instant message in a markup language generally allows for increased options and enhanced flexibility with respect to the content that may be included in an instant message, including user-defined emoticons.

Figure 7:
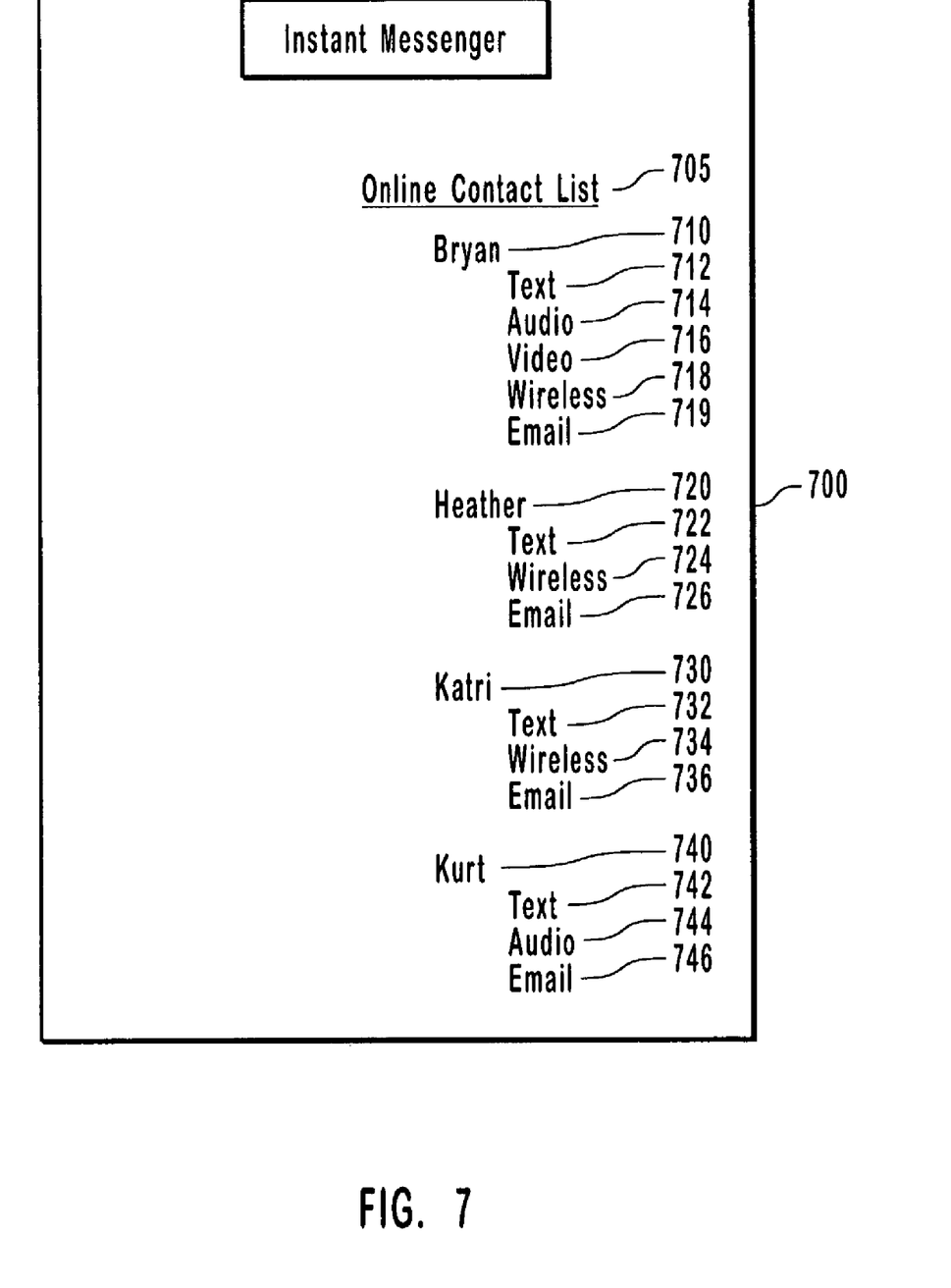
FIG. 7 illustrates an example display of various contacts' current real-time communication capabilities.

FIG. 7 illustrates at least one embodiment of the present invention involving capabilities exchange. Because users may be reached through several contact addresses, a user interface in accordance with the present invention may display the addresses where one or more contacts are available. For example, user interface 700 shows a contact list 705 that includes one or more contacts. The interface 700 may display both an online contact list 705 and a similar offline version of the same contacts that are not currently connected or otherwise unavailable.

The contact list 705 shows users Bryan 710, Heather 720, Katri 730, and Kurt 740. Specifically, user Bryan 710 is available for text-messaging 712, has audio 714 and video 716 capabilities, may be sent messages through a wireless device 718, and has an email address 719. User Heather 720 is available for text-messaging 722, for messages at a wireless device 724, and has an email address 726. Similarly, user Katri 730 is available for text messaging 732, available for messages at a wireless device 734, and has an email address 736. Finally, User Kurt 740 is available for text-messaging 742, has audio capabilities 744, and has an email address 746.

It should be appreciated that the online contact list 705 may be displayed on the user interface 700 in several different ways including symbolically, pictorially, other arrangements of text, etc., or some combination thereof. Regardless, the user interface 700 may depend at least in part on user Bryan 710, user Heather 720, user Katri 730, and user Kurt 740 exchanging capability information, such as each contact's preferences, availability or status, bandwidth, hardware, etc., for sending and/or receiving various instant messaging content.

Figure 8:
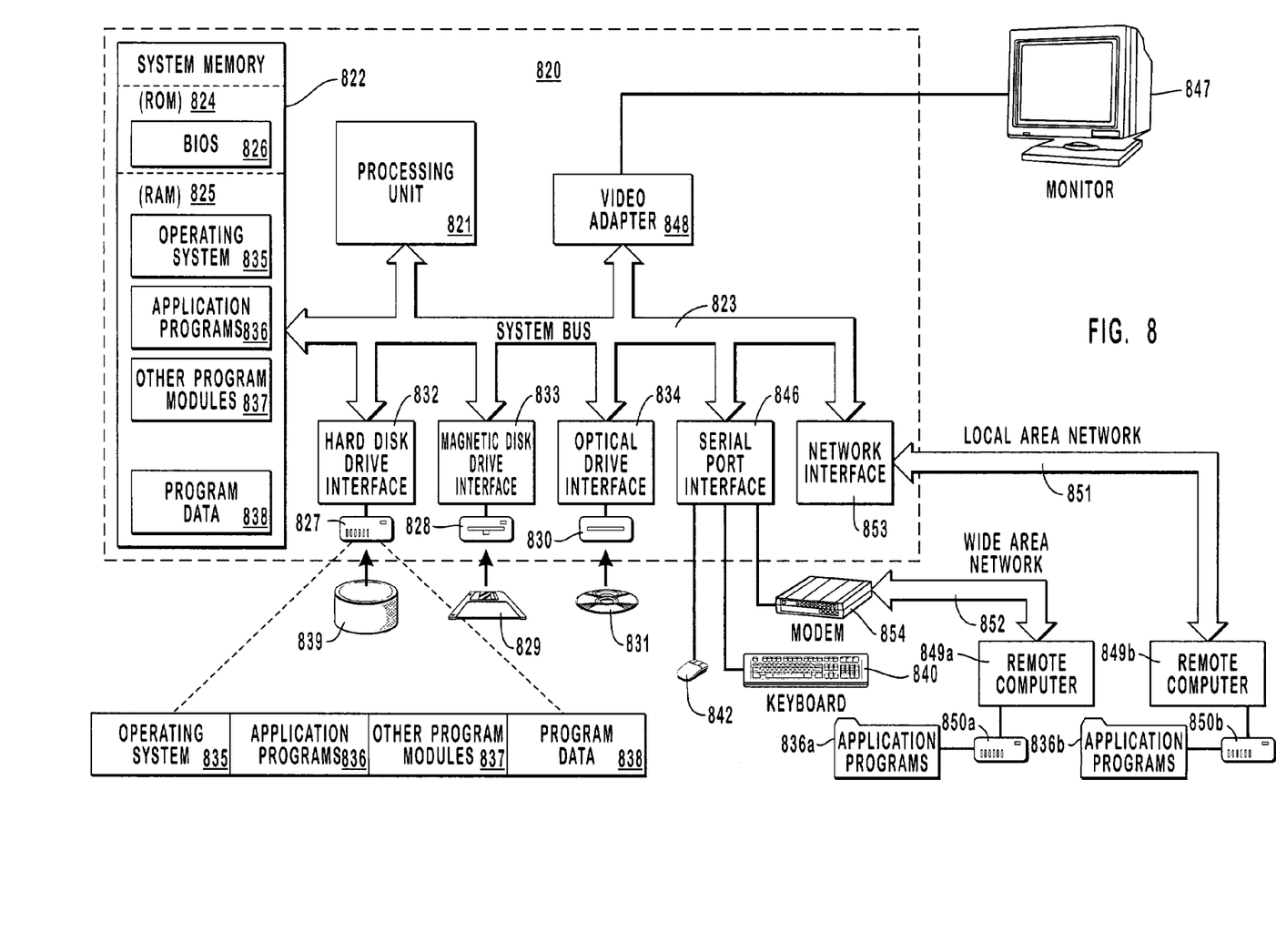
FIG. 8 illustrates an example system that provides a suitable operating environment for the present invention.

FIG. 8 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multiprocessor systems, microprocessor-based or programmable consumer electronics, network PCs, minicomputers, mainframe computers, and the like. The invention may also be practiced in distributed computing environments where local and remote processing devices perform tasks and are linked (either by hardwired links, wireless links, or by a combination of hardwired or wireless links) through a communications network. In a distributed computing environment, program modules may be located in both local and remote memory storage devices.

With reference to FIG. 8, an exemplary system for implementing the invention includes a general-purpose computing device in the form of a conventional computer 820, including a processing unit 821, a system memory 822, and a system bus 823 that couples various system components including the system memory 822 to the processing unit 821. The system bus 823 may be any of several types of bus structures including a memory bus or memory controller, a peripheral bus, and a local bus using any of a variety of bus architectures. The system memory includes read only memory (ROM) 824 and random access memory (RAM) 825. A basic input/output system (BIOS) 826, containing the basic routines that help transfer information between elements within the computer 820, such as during start-up, may be stored in ROM 824.

The computer 820 may also include a magnetic hard disk drive 827 for reading from and writing to a magnetic hard disk 839, a magnetic disk drive 828 for reading from or writing to a removable magnetic disk 829, and an optical disc drive 830 for reading from or writing to removable optical disc 831 such as a CD ROM or other optical media. The magnetic hard disk drive 827, magnetic disk drive 828, and optical disc drive 830 are connected to the system bus 823 by a hard disk drive interface 832, a magnetic disk drive-interface 833, and an optical drive interface 834, respectively. The drives and their associated computer-readable media provide nonvolatile storage of computer-executable instructions, data structures, program modules and other data for the computer 820. Although the exemplary environment described herein employs a magnetic hard disk 839, a removable magnetic disk 829 and a removable optical disc 831, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 839, magnetic disk 829, optical disc 831, ROM 824 or RAM 825, including an operating system 835, one or more application programs 836, other program modules 837, and program data 838. A user may enter commands and information into the computer 820 through keyboard 840, pointing device 842, or other input devices (not shown), such as a microphone, joy stick, game pad, satellite dish, scanner, or the like. These and other input devices are often connected to the processing unit 821 through a serial port interface 846 coupled to system bus 823. Alternatively, the input devices may be connected by other interfaces, such as a parallel port, a game port or a universal serial bus (USB). A monitor 847 or another display device is also connected to system bus 823 via an interface, such as video adapter 848. In addition to the monitor, personal computers typically include other peripheral output devices (not shown), such as speakers and printers.

The computer 820 may operate in a networked environment using logical connections to one or more remote computers, such as remote computers 849a and 849b. Remote computers 849a and 849b may each be another personal computer, a server, a router, a network PC, a peer device or other common network node, and typically include many or all of the elements described above relative to the computer 820, although only memory storage devices 850a and 850b and their associated application programs 836a and 836b have been illustrated in FIG. 8. The logical connections depicted in FIG. 8 include a local area network (LAN) 851 and a wide area network (WAN) 852 that are presented here by way of example and not limitation. Such networking environments are commonplace in office-wide or enterprise-wide computer networks, intranets and the Internet.

When used in a LAN networking environment, the computer 820 is connected to the local network 851 through a network interface or adapter 853. When used in a WAN networking environment, the computer 820 may include a modem 854, a wireless link, or other means for establishing communications over the wide area network 852, such as the Internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing communications over wide area network 852 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. In a computerized communication environment that allows a plurality of users to communicate with each other in real time, a method of real time communication that provides a sending system enhanced flexibility with respect to the type of content that may be included in a real time message and enhanced control over the presentation of the real time message at a receiving system, the method comprising acts of:

at the sending system, receiving content to be included in a real time message from a first user;

formatting the received content at the sending system in accordance with a markup language that either influences the presentation of the received content at the receiving system, or allows some level of flexibility for the type of content allowed in the received content, or both, wherein formatting the received content comprises the sending system automatically applying a default format which visually distinguishes the content received from the first user from other content provided by a second user at the receiving system; and sending to the receiving system, the real time message, including the received content which has been formatted in accordance with the markup language.

2. The method of claim 1, wherein the markup language comprises at least one of eXtensible Markup Language and HyperText Markup Language.

3. The method of claim 1, wherein the received content comprises at least one of a data file, an image file, a user defined emoticon, and a multimedia file.

4. The method of claim 1, wherein the formatting specifies at least one of a particular font and a particular font color selected to identify the user.

5. The method of claim 1, wherein the automatic formatting specifies at least one of a particular font and a particular font color.

6. The method of claim 1, wherein the received content corresponds to a previously sent real time message that is being edited at the sending system.

7. The method of claim 1, wherein the received content is being entered by a user into an input box of an initial size, the method further comprising an act of automatically increasing the size of the input box as the received content approaches the initial size of the input box so that the user can see the received content without scrolling.

8. The method of claim 1, wherein the received content comprises rich content which is received from a paste operation.

9. The method of claim 1, wherein applying a default format comprises indenting content received from the first user and the second user, and wherein each of the first and second users has a different indentation assigned thereto.

10. The method of claim 1, further comprising:

displaying identification indicia for identifying the content provided by each of the first and second users; and abstaining from displaying the identification indicia after a predetermined number of real time messages have been exchanged between the first user and the second user.

11. The method of claim 1, further comprising displaying a message at the receiving system indicating when the first user at the sending system is providing but has not yet submitted content, wherein the displayed message is provided within the context of real time messages provided by the first and second users.

12. For a computerized communication environment that allows a plurality of users to communicate with each other in real time, a computer program product comprising a computer readable medium carrying computer executable instructions for implementing a method of real time communication that provides a sending system enhanced flexibility with respect to the type of content that may be included in a real time message and enhanced control over the presentation of the real time message at a receiving system, the method comprising acts of:

at the sending system, receiving content to be included in a real time message from a first user;

formatting the received content at the sending system in accordance with a markup language that either influences the presentation of the received content at the receiving system, or allows some level of flexibility for the type of content allowed in the received content, or both, wherein formatting the received content comprises the sending system automatically applying a default format which visually distinguishes the content received from the first user from other content provided by a second user at the receiving system; and sending to the receiving system, the real time message, including the received content which has been formatted in accordance with the markup language.

13. The computer program product of claim 12, wherein the markup language comprises at least one of eXtensible Markup Language and HyperText Markup Language.

14. The computer program product of claim 12, wherein the received content comprises at least one of a data file, an image file, a user defined emoticon, and a multimedia file.

15. The computer program product of claim 12, wherein the formatting specifies at least one of a particular font and a particular font color selected to identify the user.

16. The method of claim 12, wherein the automatic formatting specifies at least one of a particular font and a particular font color.

17. The computer program product of claim 12, wherein the received content corresponds to a previously sent real time message that is being edited at the sending system.

18. The computer program product of claim 12, wherein the received content is being entered by a user into an input box of an initial size, the method further comprising an act of automatically increasing the size of the input box as the received content approaches the initial size of the input box so that the user can see the received content without scrolling.

19. The computer program product of claim 12, wherein the received content comprises rich content which is received from a paste operation.

* * * * *